(12) United States Patent
Nomura et al.

(10) Patent No.: US 7,693,406 B2
(45) Date of Patent: Apr. 6, 2010

(54) IMAGE CAPTURING APPARATUS, METHOD OF CONTROLLING THE SAME, AND STORAGE MEDIUM

(75) Inventors: Kazuo Nomura, Shiojiri (JP); Michihiro Nagaishi, Okaya (JP); Kazuhiro Sakamoto, Shiojiri (JP)

(73) Assignee: Seiko Epson Corporation (JP)

( * ) Notice: Subject to any disclaimer, the term of this patent is extended or adjusted under 35 U.S.C. 154(b) by 305 days.

(21) Appl. No.: 11/617,223

(22) Filed: Dec. 28, 2006

(65) Prior Publication Data
US 2007/0147814 A1 Jun. 28, 2007

(30) Foreign Application Priority Data
Dec. 28, 2005 (JP) ............................. 2005-378164
Jan. 12, 2006 (JP) ............................. 2006-004542

(51) Int. Cl.
*G03B 17/00* (2006.01)
*G03B 3/10* (2006.01)
*G03B 13/36* (2006.01)
*H04N 5/228* (2006.01)

(52) U.S. Cl. ..................... 396/55; 396/99; 348/208.5

(58) Field of Classification Search ............... 396/266, 396/55, 53, 52, 99; 348/208.5
See application file for complete search history.

(56) References Cited

U.S. PATENT DOCUMENTS 5,282,044 A * 1/1994 Misawa et al. ........... 348/208.5
5,335,042 A * 8/1994 Imafuji et al. ................. 396/55
6,009,279 A * 12/1999 Kai et al. ..................... 396/55
7,403,710 B2 * 7/2008 Itokawa ...................... 396/333
2005/0276590 A1 * 12/2005 Ishikawa et al. .............. 396/55
2006/0140600 A1 * 6/2006 Suda ............................ 396/52

FOREIGN PATENT DOCUMENTS

| JP | 09-080515 | 3/1997 |
|---|---|---|
| JP | 10-048681 | 2/1998 |
| JP | 2000-155347 | 6/2000 |
| JP | 2001-235782 | 8/2001 |
| JP | 2003-057712 | 2/2003 |
| JP | 2003-244520 | 8/2003 |
| JP | 2005-170460 | 6/2005 |
| JP | 2005-175796 | 6/2005 |
| JP | 2005-339726 | 12/2005 |
| JP | 2005-343368 | 12/2005 |
| JP | 2005-351960 | 12/2005 |
| JP | 20006-004542 | 1/2006 |

* cited by examiner

*Primary Examiner*—W. B. Perkey
*Assistant Examiner*—Noam Reisner
(74) *Attorney, Agent, or Firm*—Harness, Dickey & Pierce, P.L.C.

(57) ABSTRACT

An image capturing apparatus includes: a shake amount detecting unit that detects a shake amount; a composition determining unit that determines whether the composition of a picture is determined during image capturing on the basis of the correlation among a plurality of frames; a shake correcting unit that performs a shake correcting process on a captured image on the basis of the detected camera shake amount; and a correction control unit that controls the shake correcting unit to start the shake correcting process when the shake amount is smaller than a predetermined reference shake amount and it is determined that the composition of a picture is determined.

12 Claims, 10 Drawing Sheets

IMAGE CAPTURING APPARATUS, METHOD OF CONTROLLING THE SAME, AND STORAGE MEDIUM

BACKGROUND

1. Technical Field

The present invention relates to an image capturing apparatus, a control method, and a storage medium, and more particularly, to a technique for reducing power consumption of an image capturing apparatus including a shake correcting mechanism caused by the driving of the shake correcting mechanism.

2. Related Art

In image capturing apparatuses, such as digital still cameras for capturing still pictures, according to the related art, various methods of avoiding the influence of camera shake occurring during an image capturing operation have been proposed.

There has been proposed the image capturing apparatus that detects the contact of a part of the human body, such as a fingertip, with a contact detecting device, such as a shutter switch and starts operating a camera shake detecting device or a camera shake correcting device in order to reduce power required to correct camera shake (for example, see JP-A-9-80515).

However, actually, the time required for a user to take a picture from the contact with the contact detecting device is not short since it includes the time required to determine the composition of a picture, which makes it difficult to considerably reduce the power consumption of the image capturing apparatus.

SUMMARY

An advantage of some aspects of the invention is that it provides an image capturing apparatus including a shake correcting mechanism that is capable of starting the operation of the shake correcting mechanism at an appropriate timing to further reduce power consumption and reliably capturing an image when image capturing conditions are satisfied during an actual image capturing operation, a method of controlling the same, and a storage medium having a control program for realizing the control method stored therein.

According to an aspect of the invention, an image capturing apparatus includes: a shake amount detecting unit that detects a shake amount; a composition determining unit that determines whether the composition of a picture is determined during image capturing on the basis of the correlation among a plurality of frames; a shake correcting unit that performs a shake correcting process on a captured image on the basis of the detected shake amount; and a correction control unit that controls the shake correcting unit to start the shake correcting process when the shake amount is smaller than a predetermined reference shake amount and it is determined that the composition of a picture is determined.

In this way, the shake amount detecting unit may detect the shake amount.

The composition determining unit may determine whether the composition of a picture is determined on the basis of the correlation among the plurality of frames.

In this way, the correction control unit may control the shake correcting unit to start the shake correcting process when the shake amount is smaller than the predetermined reference shake amount and it is determined that the composition of a picture is determined. The shake correcting unit may perform the shake correcting process on the captured image on the basis of the detected shake amount.

According to the above-mentioned structure, it is possible to accurately check the time when the shake correcting unit is operated and to reduce power to be supplied to the shake correcting unit, resulting in a reduction in power consumption.

In the image capturing apparatus according to the above-mentioned aspect, preferably, the correction control unit determines whether the shake amount is smaller than the predetermined reference shake amount and the number of times the composition is determined is larger than a predetermined reference number of times within a predetermined period of time. When the number of times the composition is determined is larger than the predetermined reference number of times, preferably, the correction control unit controls the shake correcting unit to start the shake correcting process.

According to the above-mentioned structure, it is possible to accurately check the time when the shake correction unit is operated and to further reduce power consumption.

In the image capturing apparatus according to the above-mentioned aspect, preferably, the composition determining unit may determine that the composition of a picture is determined during image capturing when a value indicating the correlation among the plurality of frames including the current frame is larger than a predetermined reference correlation value.

According to the above-mentioned structure, it is possible to check that the composition of a picture is determined and to accurately check the time when the shake correction unit is operated.

In the image capturing apparatus according to the above-mentioned aspect, preferably, the shake correcting unit may perform the shake correcting process on the basis of at least one a lens shift process, a CCD shift process, and image processing.

According to the above-mentioned structure, it is possible to reliably correct camera shake.

In the image capturing apparatus according to the above-mentioned aspect, preferably, the shake detecting unit includes gyro sensors, and detects the shake amount on the basis of angular velocity detection signals output from the gyro sensors.

According to the above-mentioned structure, it is possible to reliably and accurately detect the shake amount and thus to accurately perform correction.

According to another aspect of the invention, an image capturing apparatus includes: a shake amount detecting unit that detects a shake amount; an image capturing condition determining unit that determines whether predetermined image capturing conditions including the shake amount are satisfied; an auto shutter operating unit that performs an image capturing process in an auto shutter mode for automatically pressing a shutter when the image capturing conditions are satisfied; and an auto shutter mode releasing unit that releases the auto shutter mode when the image capturing conditions are not satisfied in the auto shutter mode.

According to the above-mentioned structure, the shake amount detecting unit may detect a shake amount, and the image capturing condition determining unit determines whether predetermined image capturing conditions including the shake amount are satisfied.

The auto shutter operating unit may perform an image capturing process in an auto shutter mode for automatically pressing a shutter when the image capturing conditions are satisfied, and the auto shutter mode releasing unit releases the auto shutter mode when the image capturing conditions are not satisfied in the auto shutter mode.

In the image capturing apparatus according to the above-mentioned aspect, preferably, the correction control unit determines whether the shake amount is larger than a predetermined data reacquisition shake amount. When the shake amount is larger than the predetermined data reacquisition shake amount, preferably, the correction control unit controls the shake amount detecting unit to reacquire the shake amount.

According to the above-mentioned aspect, preferably the image capturing apparatus further includes: an autofocus mechanism that automatically brings a subject into focus to move a lens to a focal position; and an autofocus correcting unit that, before the image capturing process is performed in the auto shutter mode, corrects the focal position on the basis of the shake amount in the optical axis direction of the lens and moves the lens to the corrected focal position.

According to the above-mentioned aspect, preferably, the image capturing apparatus further includes an autofocus reset control unit that determines whether the shake amount is larger than a predetermined autofocus reset shake amount, and controls the autofocus mechanism to move the lens to a new focal position when the shake amount is larger than the predetermined autofocus reset shake amount.

In the image capturing apparatus according to the above-mentioned aspect, preferably, the shake amount detecting unit includes gyro sensors, and detects the shake amount on the basis of angular velocity detection signals output from the gyro sensors.

According to still another aspect of the invention, there is provided a method of controlling an image capturing apparatus including a shake correcting mechanism that performs a shake correcting process on a captured image on the basis of a shake amount. The method includes: detecting the shake amount; determining whether the composition of a picture is determined during image capturing on the basis of the correlation among a plurality of frames; and controlling the shake correcting mechanism to start the shake correcting process when the shake amount is smaller than a predetermined reference shake amount and it is determined that the composition of a picture is determined.

According to yet another aspect of the invention, there is provided a method of controlling an image capturing apparatus including a shake correcting mechanism that performs a shake correcting process on a captured image on the basis of a shake amount. The method includes: detecting the shake amount; determining whether predetermined image capturing conditions including the shake amount are satisfied; performing an image capturing process in an auto shutter mode for automatically pressing a shutter when the image capturing conditions are satisfied; and releasing the auto shutter mode when the image capturing conditions are not satisfied in the auto shutter mode.

According to still yet another aspect of the invention, there is provided a control program for allowing a computer to control an image capturing apparatus that includes a shake amount detecting unit for detecting a shake amount and a shake correcting mechanism for performing a shake correcting process on a captured image on the basis of the detected shake amount. The control program allows the computer to execute: detecting the shake amount; determining whether the composition of a picture is determined during image capturing on the basis of the correlation among a plurality of frames; and controlling the shake correcting mechanism to start the shake correcting process when the shake amount is smaller than a predetermined reference shake amount and it is determined that the composition of a picture is determined.

According to still yet another aspect of the invention, there is provided a control program for allowing a computer to control an image capturing apparatus that includes a shake amount detecting unit for detecting a shake amount and a shake correcting mechanism for performing a shake correcting process on a captured image on the basis of the detected shake amount. The control program allows the computer to execute: detecting the shake amount; determining whether predetermined image capturing conditions including the shake amount are satisfied; performing an image capturing process in an auto shutter mode for automatically pressing a shutter when the image capturing conditions are satisfied; and releasing the auto shutter mode when the image capturing conditions are not satisfied in the auto shutter mode.

BRIEF DESCRIPTION OF THE DRAWINGS

The invention will be described with reference to the accompanying drawings, wherein like numbers refer like elements.

DESCRIPTION OF EXEMPLARY EMBODIMENTS

Hereinafter, exemplary embodiments of the invention will be described with reference to the accompanying drawings.

A portable digital still camera (hereinafter, simply referred to as a 'digital still camera'), which is an example of an electronic apparatus, according to a first embodiment of the invention will be described below.

First Embodiment

Figure 1:
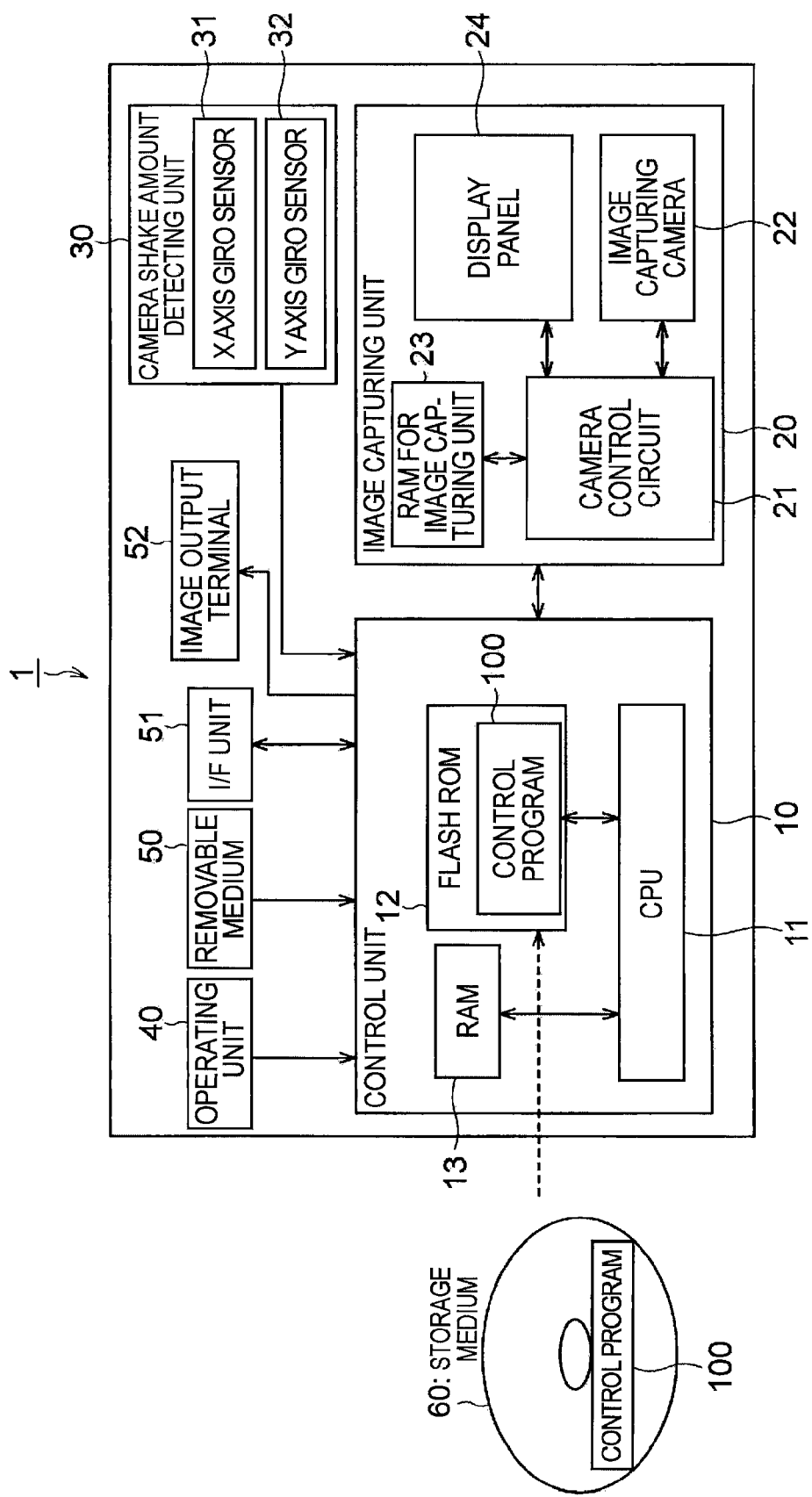
FIG. 1 is a block diagram illustrating the structure of a digital still camera according to an embodiment of the invention.

FIG. 1 is a block diagram schematically illustrating the structure of the digital still camera according to a first embodiment of the invention.

As shown in FIG. 1, a digital still camera 1 includes a control unit 10, an image capturing unit 20, an angular velocity detecting unit 30, an operating unit 40, a removable medium 50, an I/F unit 51, and an image output terminal 52.

The control unit 10 controls all components of the digital still camera 1, and includes a CPU 11 for executing various program and processing various operations, a rewritable flash ROM 12 (hereinafter, simply referred to as a 'ROM') that stores a control program 100 executed by the CPU 11 and various data, a RAM 13 for temporarily storing the results operated by the CPU 11 and various data, and a timer circuit for checking time in a self-timer capturing mode. The control program 100 stored in the ROM 12 includes an image display processing program for performing autofocus correction.

For example, the control program 100 can be stored in various types of computer readable storage media 60 including a ROM (a rewritable semiconductor memory, such as an EEPROM), a semiconductor memory card, optical disk storage media, such as CD-ROM and DVD-ROM, and magnetic storage media, such as a flexible disk and a hard disk, to be distributed. The digital still camera 1 can be connected to a personal computer through a cable or over a communication network so as to communicate with the personal computer. In this way, the digital still camera 1 can read out the control program 100 of the storage medium 60 from the personal computer and store the read control program 100 in the flash ROM 12.

Next, the image capturing unit 20 captures an image of a subject as a still picture, and includes a camera control circuit 21, an image capturing camera 22, a RAM 23 for the image capturing unit, and a display panel 24.

The camera control circuit 21 controls all components of the image capturing unit 20 under the control of the control unit 10. The image capturing camera 22 captures an image using a CCD sensor or a CMOS image sensor. The image capturing camera 22 outputs corresponding image data to the camera control circuit 21. In this case, in the CCD sensor or the CMOS image sensor, photoelectric elements are two-dimensionally arranged in a matrix or in a honeycomb shape.

The image capturing camera 22 includes an optical lens system, a lens driving device, an iris driving device, and an A/D converting circuit. The optical lens system includes a plurality of optical lenses. The lens driving device drives the optical lens system to perform zooming and focusing operations. The iris driving device drives an iris to perform automatic exposure. The A/D converting circuit converts analog signals acquired by the CCD or CMOS image sensor into digital signals and outputs the digital signals as image data.

The RAM 23 for the image capturing unit temporarily stores the image data.

The display panel 24 displays various information items such as a captured image and a set image. The display panel 24 is composed of a flat display panel, such as a liquid crystal display panel or an organic EL panel.

The removable medium 50 stores captured moving picture data. The removable medium 50 is composed of, for example, a videotape, a recordable optical disk, or a removable hard disk.

In this structure, image data for frames output from the image capturing camera 22 is processed by the camera control circuit 21 in a predetermined manner. Then, the image data is temporarily stored in the RAM 23 for the image capturing unit. Also, the image data is sequentially stored to the removable medium 50 through the control unit 10 as moving picture data. The image data stored in the RAM 23 for the image capturing unit is used to perform a live view display of a captured moving picture image on the display panel 24. The image data of the still picture image stored in the removable medium 50 is used to display the still picture image after the image capturing.

Figure 2:
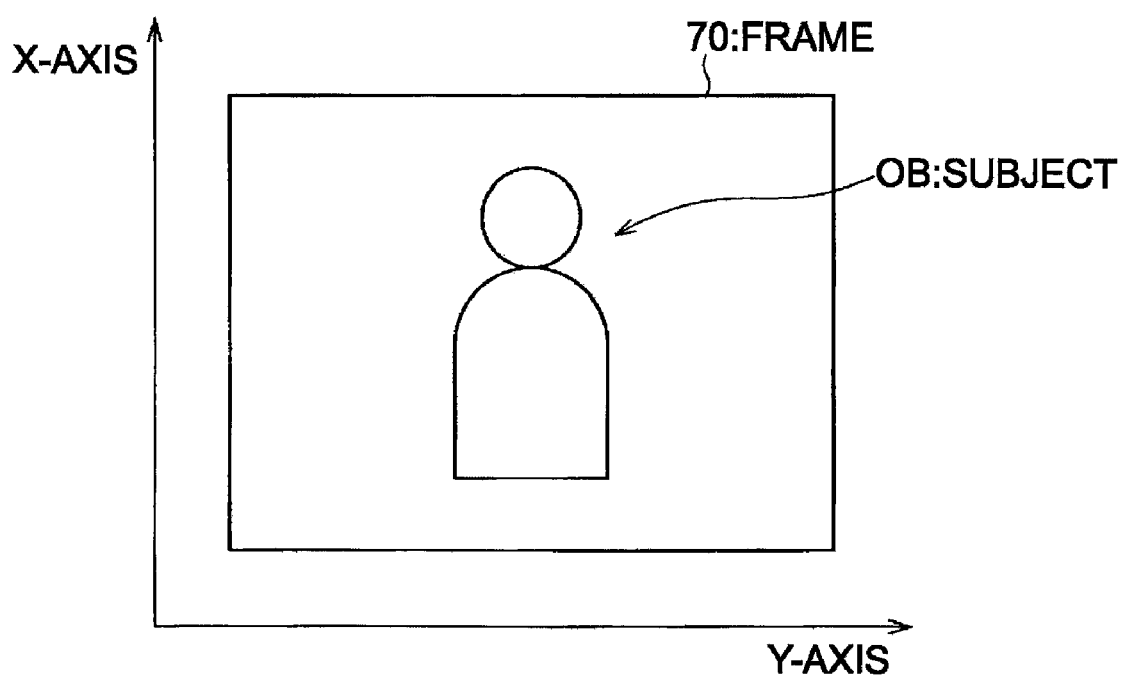
FIG. 2 is a diagram illustrating the axis of an angular velocity.

FIG. 2 is a diagram illustrating an angular velocity axis.

The angular velocity detecting unit 30 serves as a camera shake detecting unit for detecting the amount of camera shake. More specifically, as shown in FIG. 2, the angular velocity detecting unit 30 detects an angular velocity in the height direction of a frame 70 (hereinafter, referred to as an X-axis) and an angular velocity in the horizontal direction thereof (hereinafter, referred to as a Y-axis). That is, as shown in FIG. 1, the angular velocity detecting unit 30 includes two gyro sensors 31 and 32, that is, an X-axis gyro sensor 31 and a Y-axis gyro sensor 32. The gyro sensors 31 and 32 output angular velocity detection signals having voltage values corresponding to the angular velocities to the control unit 10.

The control unit 10 receives the angular velocity detection signals output from the gyro sensors 31 and 32 in synchronization with a sampling period of the frame 70. In this way, the control unit 10 calculates the amounts of camera shake in the X-axis and Y-axis on the basis of the angular velocities corresponding to the angular velocity detection signals. Then, the control unit 10 stores the calculated amounts of camera shake in the removable medium 50 so as to be associated with the image data of the frame 70, or it adds the calculated amounts of camera shake to the image data and stores the added data in the removable medium 50.

In this embodiment of the invention, the control unit 10 uses the gyro sensors 31 and 32 to calculate the angular velocity integrated in a predetermined sampling period and thus a camera shake amount θ in a predetermined sampling period (a camera shake amount θx in the X-axis direction and a camera shake amount θy in the Y-axis direction). When the angular velocity (rad/s) is zero due to the individual difference between the gyro sensors 31 and 32, the voltage values of the angular velocity detection signals are different from each other. Therefore, in this embodiment, the control unit 10 samples the angular velocity detection signals of the gyro sensors 31 and 32 and sets the average value of the sampled signals as a zero voltage value before the camera operates after being supplied with power. In this case, the control unit 10 calculates a plurality of zero voltage values over a predetermined time. When the ratio of zero voltage values that are equal to or smaller than the average value of the calculated zero voltage values is larger than a predetermined value (for example, 99%), the control unit 10 sets the average value of the zero voltage values as an actual zero voltage value. In this way, it is possible to set a zero voltage value when the camera is not operated.

The operating unit 40 includes a plurality of operating keys operated by a user. For example, the operating unit 40 has operating keys, such as a power button and buttons for inputting various instructions to start/stop capturing an image.

The I/F unit 51 is an interface for connecting the digital still camera 1 to a personal computer through a cable so as to communicate with the personal computer. When the image data stored in the removable medium 50 is output to the personal computer, the image data is output to the personal computer via the I/F unit 51.

The image output terminal 52 is a terminal used to output image signals corresponding to the image data to an external display apparatus, such as a television or a projector. The digital still camera 1 includes an audio circuit for recording or playing back an audio signal and an audio output terminal for outputting the audio signal to an external speaker or an external amplifier, in addition to the above-mentioned components.

Next, the operation of the digital still camera will be described below.

Figure 3:
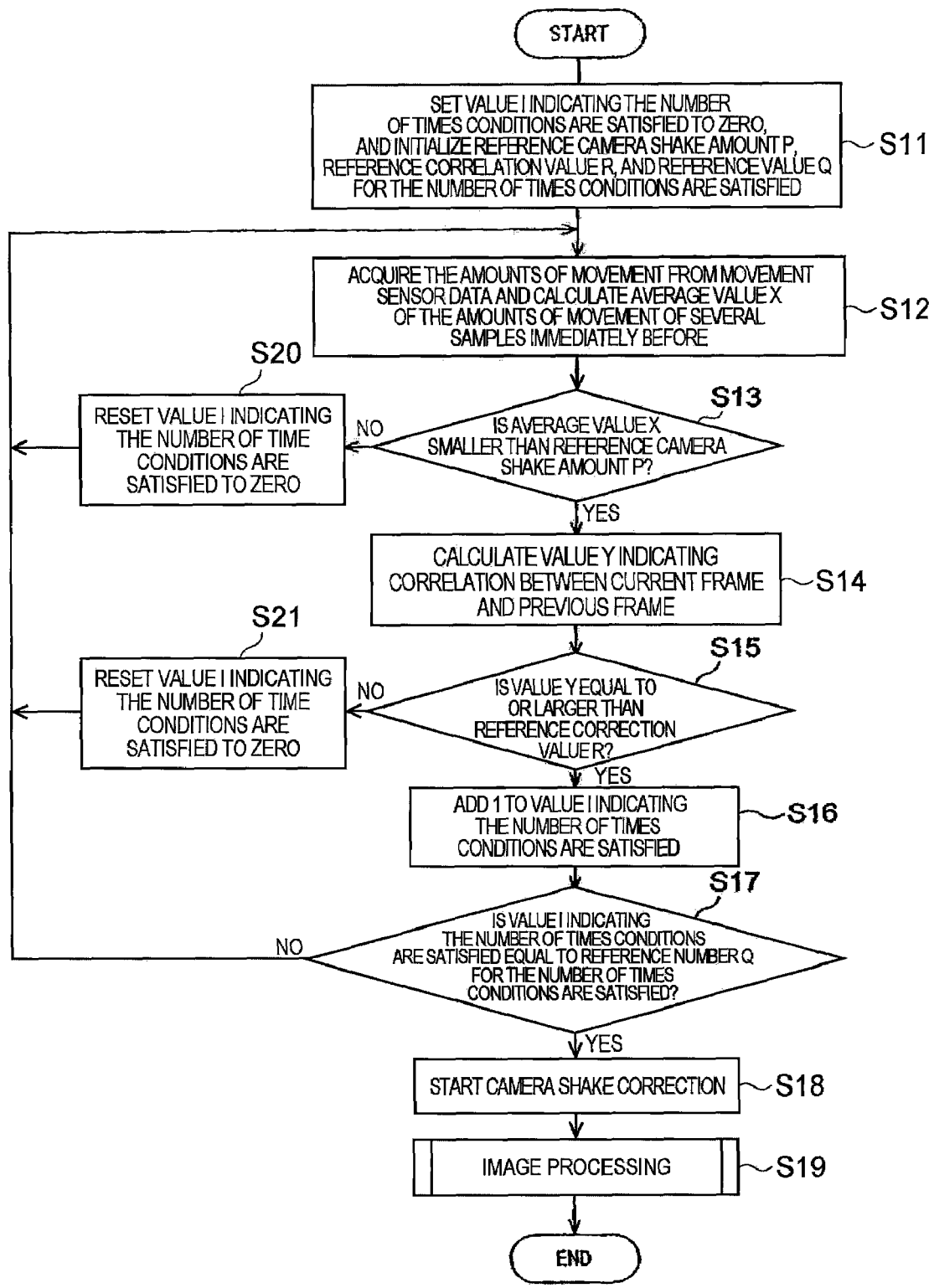
FIG. 3 is a flow chart illustrating a process according to a first embodiment.

FIG. 3 is a flow chart illustrating a process according to the first embodiment.

First, the CPU 11 of the control unit 10 initializes a reference camera shake amount P, a reference correlation value R, and a reference value Q for the number of times conditions are satisfied while setting a value I indicating the number of times a condition is satisfied to zero (step S11).

Next, the CPU 11 controls the camera shake amount detecting unit 30 to acquire the amounts of movement on the basis of signals output from the X-axis gyro sensor 31 and the Y-axis gyro-sensor 32, which are movement sensor data, and calculates an average value X of the amounts of movement of several samples immediately before (step S12).

Then, the CPU 11 determines whether the average value X of the amounts of movement is smaller than the reference camera shake amount P, that is, X<P (step S13).

When it is determined in step S13 that the average value X of the amounts of movement is equal to or larger than the reference camera shake amount P, that is, X≧P, the CPU 11 determines that the user is not ready to take a picture using the digital still camera 1, that is, the user is in a stage before photographing, and sets the value I indicating the number of times a condition is satisfied to zero (step S20). Then, the process proceeds to step S12.

When it is determined in step S13 that the average value X of the amounts of movement is smaller than the reference camera shake amount P, that is, X<P, the CPU 11 calculates a value Y indicating the correlation between the current frame and the previous frame (step S14).

Then, the CPU 11 determines whether the value Y is equal to or larger than the reference correlation value R, that is, Y≧R (step S15).

When it is determined in step S15 that the value Y is smaller than the reference correlation value R, that is, Y<R, the CPU 11 determines that the user is not ready to take a picture using the digital still camera 1, that is, the user is in a stage before photographing in which the user does not compose a picture, adjusts the distance to a subject with the zoom, or changes the direction of the digital still camera 1, and sets the value I indicating the number of times a condition is satisfied to zero (step S20). Then, the process proceeds to step S12 again.

When it is determined in step S15 that the value Y indicating the correlation between the current frame and the previous frame is equal to or larger than the reference correlation value R, that is, Y≧R, the CPU 11 determines that predetermined conditions (image capturing conditions) are satisfied, that is, the camera shake amount is smaller than a predetermined reference camera shake amount, the correlation between the current frame and the previous frame is strong, and the composition of a picture is determined. Therefore, the CPU 11 adds 1 to the value I indicating the number of times a condition is satisfied (step S16).

Then, the CPU 11 determines whether the value I indicating the number of times a condition is satisfied is equal to the reference value Q for the number of times conditions are satisfied (step S17).

When it is determined in step S17 that the value I indicating the number of times a condition is satisfied is equal to the reference value Q for the number of times conditions are satisfied, that is, when the image capturing conditions are continuously satisfied by the number of times corresponding to the reference value Q for the number of times conditions are satisfied, the CPU 11 starts a camera shake correcting process (step S18).

That is, when a lens is driven to perform optical camera shake correction, the CPU 11 supplies power to a lens driving/camera shake correcting mechanism for driving the lens and starts the camera shake correction on the basis of the output of the camera shake amount detecting unit 30. When a CCD is driven to perform optical camera shake correction, the CPU 11 supplies power to a CCD driving/camera shake correcting mechanism for driving the CCD and starts the camera shake correction on the basis of the output of the camera shake amount detecting unit 30. When image processing is performed to correct camera shake, the CPU 11 supplies power to an image processing circuit, or the CPU 11 sets its own processing clock as a high-speed clock to start correcting camera shake.

Then, the CPU 11 performs an image capturing process (step S19).

Figure 4:
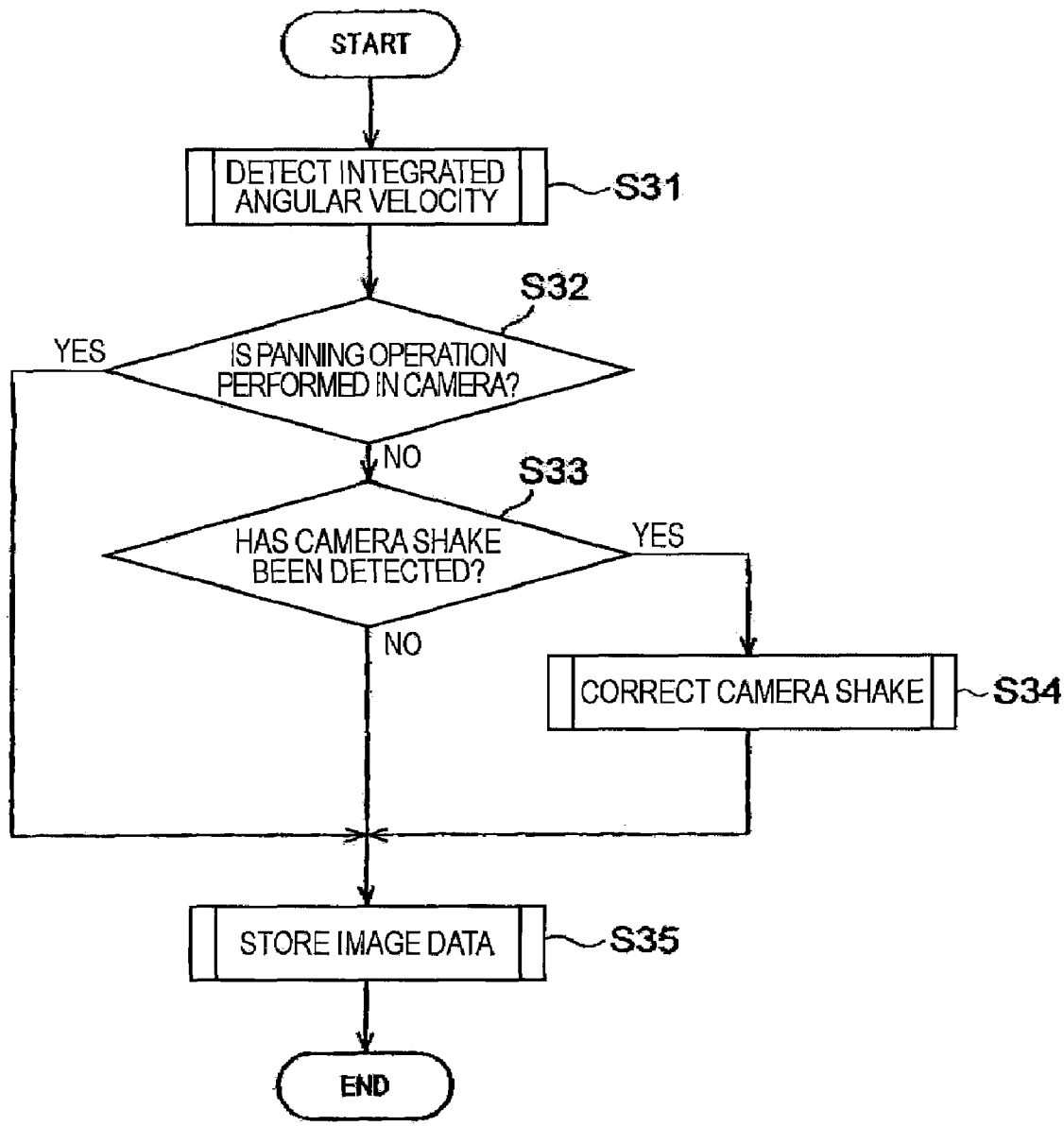
FIG. 4 is a flow chart illustrating an image capturing process.

FIG. 4 is a flow chart illustrating the image capturing process.

In this case, when a shutter switch is pressed by half, the CPU 11 controls the camera control circuit 21 to perform automatic exposure control, thereby performing autofocus control.

When the shutter switch is completely pressed, the CPU 11 detects an integrated angular velocity in a predetermined sampling period on the basis of signals output from the camera shake amount detecting unit 30 (step S31).

The calculation of the integrated angular velocity by the control unit 10 will be simply described below. The CPU 11 of the control unit 10 calculates an angular velocity (rad/s) on the basis of the angular velocity detecting signal and integrates the angular velocity (rad/s) with respect to a predetermined sampling interval (second) to calculate an integrated angular velocity Σ (rad/s). Actually, the CPU 11 calculates an integrated angular velocity Σx in the X-axis direction and an integrated angular velocity Σy in the Y-axis direction as the integrated angular velocity.

Then, the CPU 11 determines whether a panning operation of the digital still camera is performed on the basis of the integrated angular velocity Σx in the X-axis direction and the integrated angular velocity Σy in the Y-axis direction (step S32). The panning operation means that the shutter switch is pressed by half with a subject disposed at the center of the screen, and the digital still camera is moved in a direction, with autofocus locked to the subject, to arrange the subject at the side of the screen.

When it is determined in step S32 that the panning operation is performed in the digital still camera (step S32; Yes), it is necessary to keep autofocus in a locked state without considering camera shake, and thus the CPU 11 instantaneously proceeds to an image data acquiring process (step S35). Therefore, the CPU 11 performs autofocus control to fix the lens at a focal position where autofocus is locked, and the image capturing camera 22 captures an image. Then, image data obtained by the image capturing camera is temporarily stored in the RAM 23 for the image capturing unit, and is then stored in the removable medium 50 under the control of the CPU 11 of the control unit 10. In this way, an image data acquiring process is performed (step S35).

The captured image is displayed on the display panel 24 while the image data is stored in the removable medium 50.

When it is determined in step S32 that the digital still camera does not perform the panning operation (step S32; No), the CPU 11 of the control unit 10 calculates the camera shake amount θx (mm) in the X-axis direction and the camera shake amount θy (mm) in the Y-axis direction on the basis of the calculated integrated angular velocity Σx in the X-axis direction and the calculated integrated angular velocity Σy in the Y-axis direction. Then, the CPU 11 determines whether at least one of the camera shake amount θx (mm) in the X-axis direction and the camera shake amount θy (mm) in the Y-axis direction is larger than an allowable value (step S33). In the case, the allowable value is set to an appropriate value according to image capturing conditions, such as zoom magnification and a shutter speed.

When it is determined in step S33 that at least one of the camera shake amount θx (mm) in the X-axis direction and the camera shake amount θy (mm) in the Y-axis direction is larger than the allowable value (step S33; Yes), the CPU 11 performs a camera shake correcting process (step S34).

In the camera shake correcting process, when the image capturing camera 22 is provided with a lens driving/camera shake correcting mechanism, the camera control circuit 21 drives the lens driving/camera shake correcting mechanism to correct camera shake under the control of the CPU 11. When the image capturing camera 22 is provided with a CCD driving/camera shake correcting mechanism, the camera control circuit 21 drives the CCD driving/camera shake correcting mechanism to correct camera shake under the control of the CPU 11. When image processing is performed to correct camera shake, power is supplied to an image processing circuit, or a processing clock of the CPU 11 is changed to a high-speed clock to correct camera shake.

Then, the CPU 11 temporarily stores the corrected image data in the RAM 23 for the image capturing unit, and performs an image data storing process of storing the image data in the removable medium 50 (step S35).

As described above, according to the first embodiment, it is possible to accurately check the time when a user, photographer, takes a picture actually on the basis of the movement of the digital still camera or the movement of the composition of a picture. In addition, it is possible to accurately check the time when a camera shake correcting mechanism for correcting camera shake is operated. Therefore, it is possible to accurately check the time when power is actually supplied to the camera shake correcting mechanism and thus to reduce the power consumption of the digital still camera.

Second Embodiment

A second embodiment of the invention is similar to the first embodiment in the structure of the first embodiment, and thus a detailed description of the structure of the second embodiment will be explained with reference to FIGS. 1 and 2.

Figure 5:
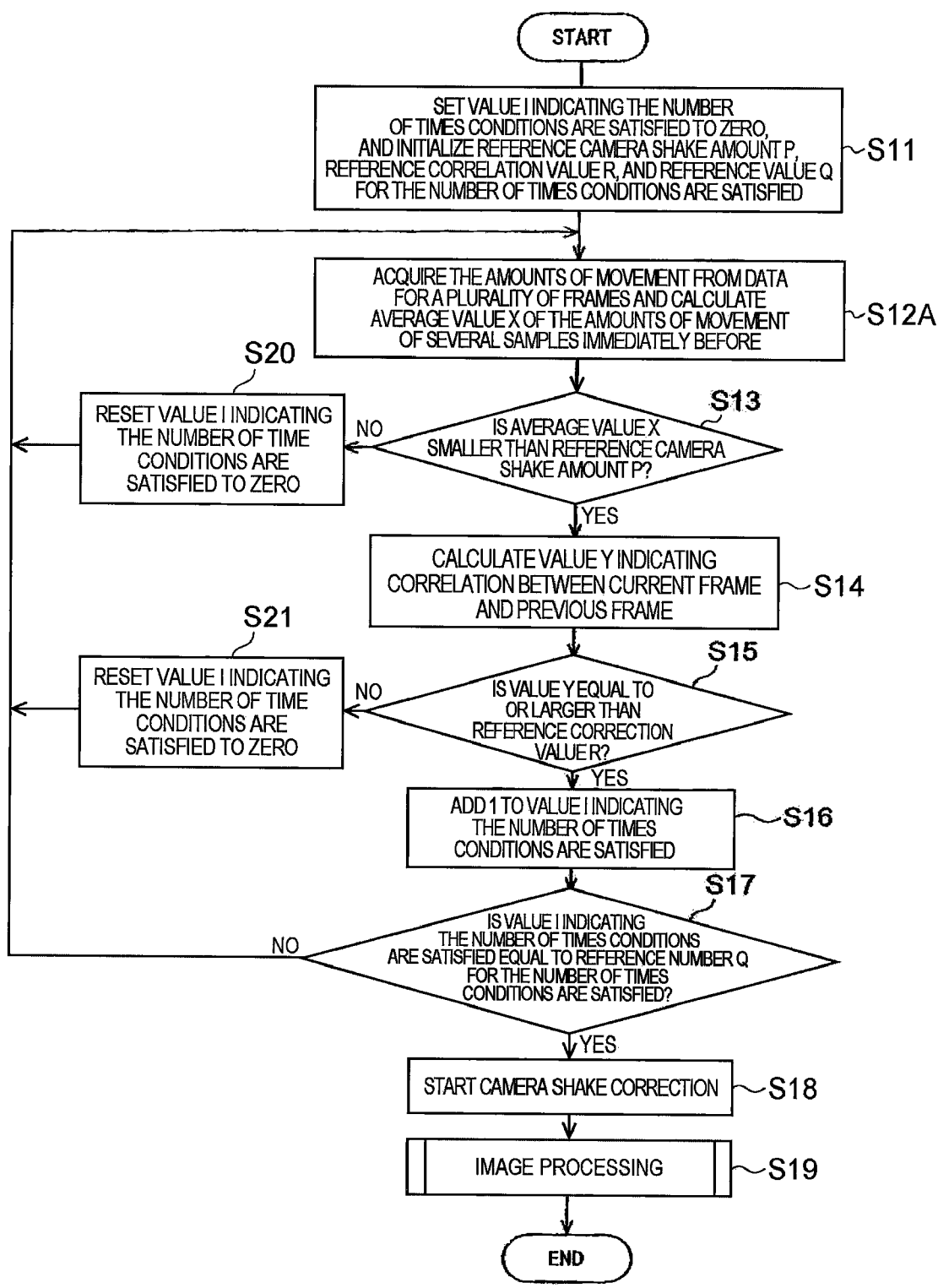
FIG. 5 is a flow chart illustrating a process according to a second embodiment.

FIG. 5 is a flow chart illustrating a process according to the second embodiment.

In FIG. 5, components performing the same processes as those in FIG. 3 have the same reference numerals as those in the first embodiment.

In the second embodiment, in an initial state, power is not supplied to the X-axis gyro sensor 31 and the Y-axis gyro sensor 32 constituting the camera shake amount detecting unit 30 in order to further reduce the power consumption of the digital still camera.

First, the CPU 11 initializes a reference camera shake amount P, a reference correlation value R, and a reference value Q for the number of times conditions are satisfied while setting a value I indicating the number of times a condition is satisfied to zero (step S11).

Next, the CPU 11 performs image processing to acquire the amounts of movement from data for a plurality of frames and calculates an average value X of the amounts of movement of several samples immediately before (step S12A).

Then, the CPU 11 determines whether the average value X of the amounts of movement is smaller than the reference camera shake amount P, that is, X<p (step S13).

When it is determined in step S13 that the average value X of the amounts of movement is equal to or larger than the reference camera shake amount P, that is, X≧P, the CPU 11 determines that the user is not ready to take a picture using the digital still camera 1, that is, the user is in a stage before photographing, and sets the value I indicating the number of times a condition is satisfied to zero (step S20). Then, the process proceeds to step S12.

When it is determined in step S13 that the average value X of the amounts of movement is smaller than the reference camera shake amount P, that is, X<P, the CPU 11 calculates a value Y indicating the correlation between the current frame and the previous frame (step S14).

Then, the CPU 11 determines whether the value Y is equal to or larger than the reference correlation value R, that is, Y≧R (step S15).

When it is determined in step S15 that the value Y is smaller than the reference correlation value R, that is, Y<R, the CPU 11 determines that the user is not ready to take a picture using the digital still camera 1, that is, the user is in a stage before photographing in which the user does not compose a picture, adjusts the distance to a subject with the zoom, or changes the direction of the digital still camera 1, and sets the value I indicating the number of times a condition is satisfied to zero (step S20). Then, the process proceeds to step S12 again.

When it is determined in step S15 that the value Y indicating the correlation is equal to or larger than the reference correlation value R, that is, Y≧R, the CPU 11 determines that predetermined conditions (image capturing conditions) are satisfied, that is, the camera shake amount is smaller than a predetermined reference camera shake amount, the correlation between the current frame and the previous frame is strong, and the composition of a picture is determined. Therefore, the CPU 11 adds 1 to the value I indicating the number of times a condition is satisfied (step S16).

Then, the CPU 11 determines whether the value I indicating the number of times a condition is satisfied is equal to the reference value Q for the number of times conditions are satisfied (step S17).

When it is determined in step S17 that the value I indicating the number of times a condition is satisfied is equal to the reference value Q for the number of times conditions are satisfied, that is, when the image capturing conditions are continuously satisfied by the number of times corresponding to the reference value Q for the number of times conditions are satisfied, the CPU 11 starts a camera shake correcting process (step S18).

The CPU 11 starts supplying power to the X-axis gyro sensor 31 and the Y-axis gyro sensor 32 constituting the camera shake amount detecting unit 30.

That is, when a lens is driven to perform optical camera shake correction, the CPU 11 supplies power to a lens driving/camera shake correcting mechanism for driving the lens and starts the camera shake correction on the basis of the output of the camera shake amount detecting unit 30. When a CCD is driven to perform optical camera shake correction, the CPU 11 supplies power to a CCD driving/camera shake correcting mechanism for driving the CCD and starts the camera shake correction on the basis of the output of the camera shake amount detecting unit 30. When image processing is performed to correct camera shake, the CPU 11 supplies power to an image processing circuit, or the CPU 11 sets its own processing clock as a high-speed clock to start correcting camera shake.

Then, the CPU 11 performs the above-mentioned image capturing process (step S19; steps S31 to S35).

In the camera shake correcting process, when the image capturing camera 22 is provided with a lens driving/camera shake correcting mechanism, the camera control circuit 21 drives the lens driving/camera shake correcting mechanism to correct camera shake under the control of the CPU 11. When the image capturing camera 22 is provided with a CCD driving/camera shake correcting mechanism, the camera control circuit 21 drives the CCD driving/camera shake correcting mechanism to correct camera shake under the control of the CPU 11. When image processing is performed to correct camera shake, power is supplied to an image processing circuit, or a processing clock of the CPU 11 is changed to a high-speed clock to correct camera shake.

As described above, according to the second embodiment, it is possible to accurately check the time when a user, photographer, takes a picture actually on the basis of the movement of the digital still camera or the movement of the composition of a picture. In addition, it is possible to accurately check the time when a camera shake correcting mechanism for correcting camera shake is operated. Therefore, it is possible to accurately check the time when power is actually supplied to the camera shake correcting mechanism and thus to reduce the power consumption of the digital still camera.

Third Embodiment

In the first and second embodiments, after image capturing conditions are satisfied, image capturing is performed according to the operation of the shutter switch by the user. However, an auto-shutter function for allowing the digital still camera to automatically capture an image after image capturing conditions are satisfied may be realized. The auto-shutter function makes it possible to prevent camera shake due to a shutter operation and thus to obtain a clear image without blur since the user does not need to press the shutter when taking a picture.

First, the technical background of the third embodiment will be described before the detailed description thereof.

In the related art, image capturing apparatuses, such as digital still cameras for capturing a still picture, that have an autofocus mechanism capable of automatically measuring the distance to a subject and adjusting the position of a lens to focus the lens on the subject have been proposed.

The autofocus mechanism makes it unnecessary for the user to manually focus the lens on the subject, and can automatically focus the lens on the subject, which makes it possible to simplify the operation of the image capturing apparatus.

In the image capturing apparatus according to the related art, since a simple mechanism is used, a contrast detecting method is used as a method of detecting a focal position (for example, see JP-A-2003-195156).

The contrast detecting method performs autofocus control on the basis of the principle that the maximum contrast ratio of an image is obtained at the focal position.

In the contrast detecting method, the lens is actually driven, and the position where the maximum contrast is obtained is regarded as a focal position. Therefore, when the distance between the lens and the subject varies due to camera shake during detection, it is difficult to obtain exact contrast information, which results in inaccurate autofocus control.

Therefore, an object of the third embodiment is to provide an image capturing apparatus capable of using the contrast detecting method to acquire accurate contrast information and thus to perform accurate autofocus control even when camera shake occurs, a method of controlling the image capturing apparatus, and a storage medium having a control program stored therein, in addition to the objects of the first and second embodiments.

Next, the third embodiment will be described in detail below. In the third embodiment, the structure of the image capturing apparatus is similar to those according to the first and second embodiments, and thus a detailed description thereof will be explained with reference to FIGS. 1 and 2.

Next, the operation of the third embodiment will be described.

Figure 6:
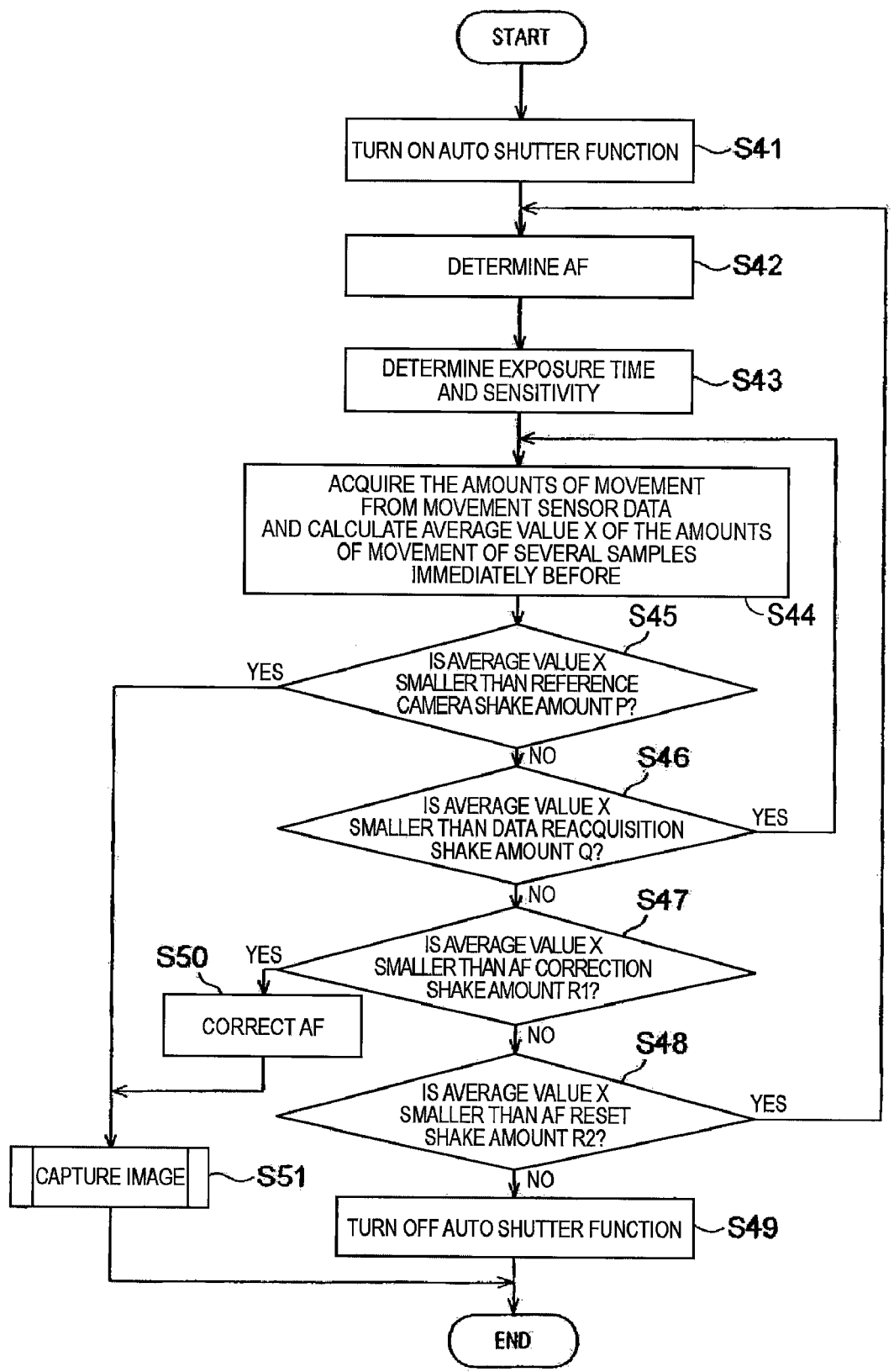
FIG. 6 is a flow chart illustrating a process according to a third embodiment.

FIG. 6 is a flow chart illustrating a process according to the third embodiment.

First, the CPU 11 turns on an autofocus function of automatically pressing a shutter when a predetermined image capturing condition is satisfied (step S41).

Then, when the shutter is pressed by half, the CPU 11 controls the camera control circuit 21 to perform autofocus control (step S42).

Figure 7:
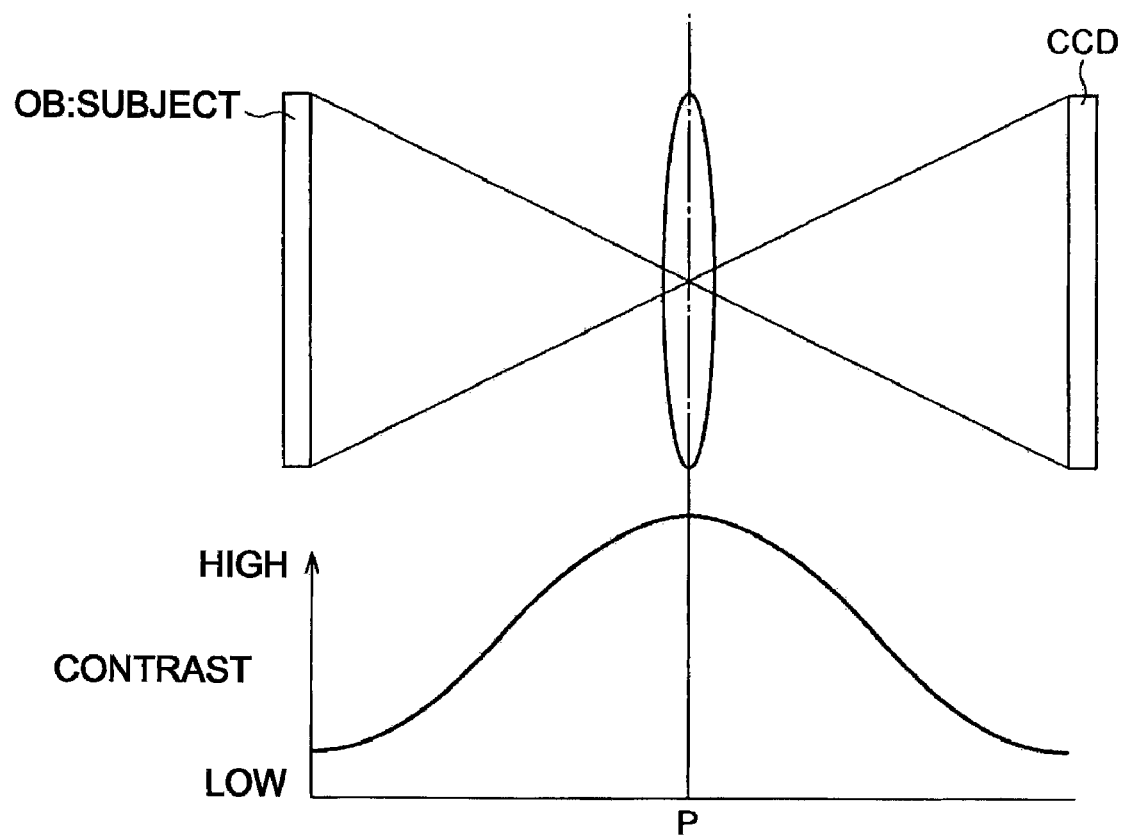
FIG. 7 is a diagram illustrating autofocus control performed by a contrast detecting method.

FIG. 7 is a diagram illustrating the autofocus control performed by the contrast detecting method.

According to the contrast detecting method, the lens is actually driven, and the position where the maximum contrast is obtained is regarded as a focal position. That is, since the position P of the lens shown in FIG. 7 is a focal position, the lens is fixed at the position P, that is, the lens is in an autofocus lock state at the position P.

Then, the CPU 11 controls the camera control circuit 21 to perform auto exposure control and to set sensitivity (ISO sensitivity) (step S43).

When the shutter switch is fully pressed, the CPU 11 controls the camera shake amount detecting unit 30 to acquire the amounts of movement on the basis of angular velocity detection signals output from the X-axis gyro sensor 31 and the Y-axis gyro-sensor 32, which are movement sensor data, and calculates an average value X of the amounts of movement of several samples immediately before (step S44).

The calculation of the amounts of movement will be simply described below. The CPU 11 calculates an angular velocity (rad/s) on the basis of the angular velocity detection signal and integrates the angular velocity (rad/s) with respect to a predetermined sampling interval (second) to calculate an integrated angular velocity $\Sigma$ (rad/s). Actually, the control unit 10 calculates an integrated angular velocity $\Sigma x$ in the X-axis direction and an integrated angular velocity $\Sigma y$ in the Y-axis direction as the integrated angular velocity, that is, the amounts of movement.

Then, the CPU 11 determines whether the average value X of the amounts of movement is smaller than a reference camera shake amount P, that is, X<p (step S45).

When it is determined in step S45 that the average value X of the amounts of movement is smaller than the reference camera shake amount P, that is, X<P, the CPU 11 determines that image capturing conditions including autofocus, exposure, and camera shake are satisfied, and performs image capturing (step S51).

Next, the image capturing process will be described.

In the image capturing process, the CPU 11 determines whether a panning operation of the digital still camera is performed on the basis of the integrated angular velocity $\Sigma x$ in the X-axis direction and the integrated angular velocity $\Sigma y$ in the Y-axis direction. The panning operation means that the shutter switch is pressed by half with a subject disposed at the center of the screen, and the digital still camera is moved in a direction, with autofocus locked to the subject, to arrange the subject at the side of the screen.

When it is determined that the panning operation is performed in the digital still camera, it is necessary to keep autofocus in a locked state without considering camera shake. Therefore, the CPU 11 instantaneously performs an image data acquiring process to fix the lens at a focal position where autofocus is locked by autofocus control in step S42. Then, when the image capturing camera 22 captures an image, the CPU 11 temporarily stores image data obtained by the image capturing camera in the RAM 23 for the image capturing unit, and then performs an image data acquiring process of storing the image data in the removable medium 50. Then, the CPU 11 displays the captured image on the display panel 24 while storing the image data in the removable medium 50.

When it is determined in step S45 that the average value X of the amounts of movement is equal to or larger than the reference camera shake amount P, that is, $X \geq P$, the CPU 11 determines that the image capturing conditions are not satisfied and determines whether the average value X of the amounts of movement is smaller than a data reacquisition shake amount Q (>P) for determining whether to check the amount of camera shake again, that is, X<Q (step S46).

When it is determined in step S46 that the average value X of the amounts of movement is smaller than the data reacquisition shake amount Q, that is, X<Q, the CPU 11 performs step S44 and controls the camera shake amount detecting unit 30 to acquire the amounts of movement on the basis of angular velocity detection signals output from the X-axis gyro sensor 31 and the Y-axis gyro-sensor 32, which are movement sensor data, and calculates the average value X of the amounts of movement of several samples immediately before. Then, the process proceeds to step S45.

When it is determined in step S46 that the average value X of the amounts of movement is equal to or larger than the data reacquisition shake amount Q, that is, $X \geq Q$, the CPU 11 determines whether the average value X of the amounts of movement is smaller than an AF correction shake amount R1 (>Q>P), that is, x<R1, so as to determine whether it is possible to avoid the influence of the deviation of autofocus by correction (step S47).

When it is determined in step S47 that the average value X of the amounts of movement is smaller than the AF correction shake amount R1, that is, X<R1, the CPU 11 performs an autofocus correcting process (step S50).

Next, the autofocus correcting process will be described below.

Figure 8:
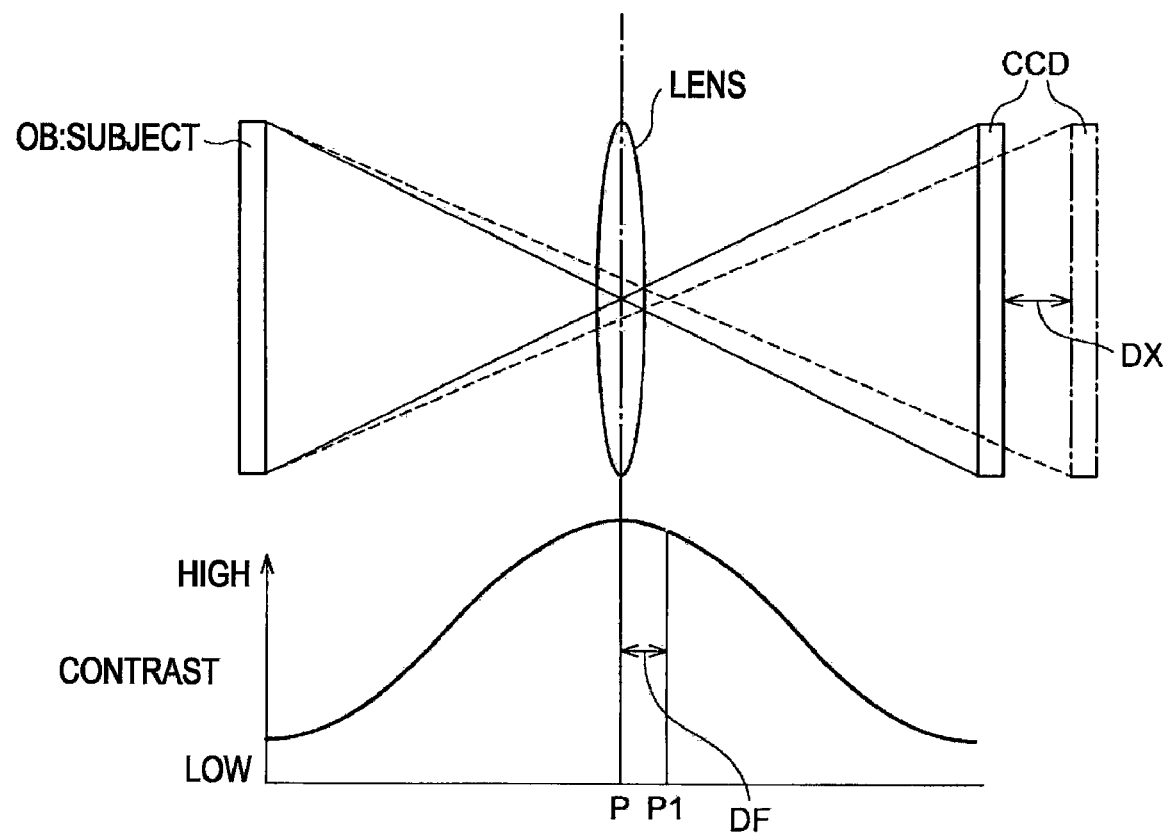
FIG. 8 is a diagram illustrating the principle of an autofocus correcting process.

FIG. 8 is a diagram illustrating the principle of the autofocus correcting process.

As shown in FIG. 8, the difference DF between a focal position P when no camera shake occurs and a focal position P1 when camera shake occurs is correlated with the amount DX of movement due to the shaking of a CCD of a digital still camera 11. Therefore, the detection of the amount DX of movement due to the shaking of the digital still camera 11 makes it possible to correct the focal position from the position P to the position P1.

Figure 9:
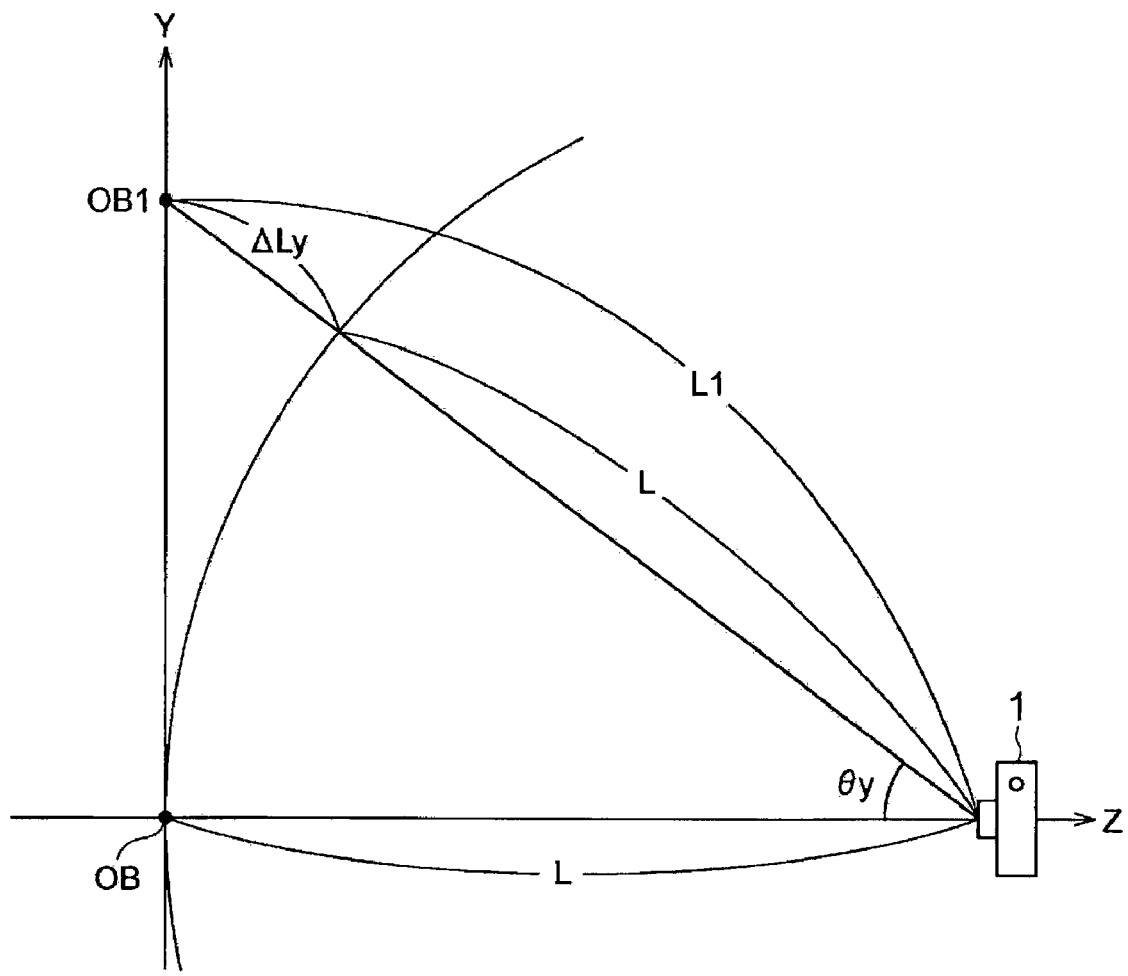
FIG. 9 is a diagram illustrating an autofocus correcting process in the Y-axis direction.

FIG. 9 is a diagram illustrating the autofocus correcting process in the Y-axis direction.

Figure 10:
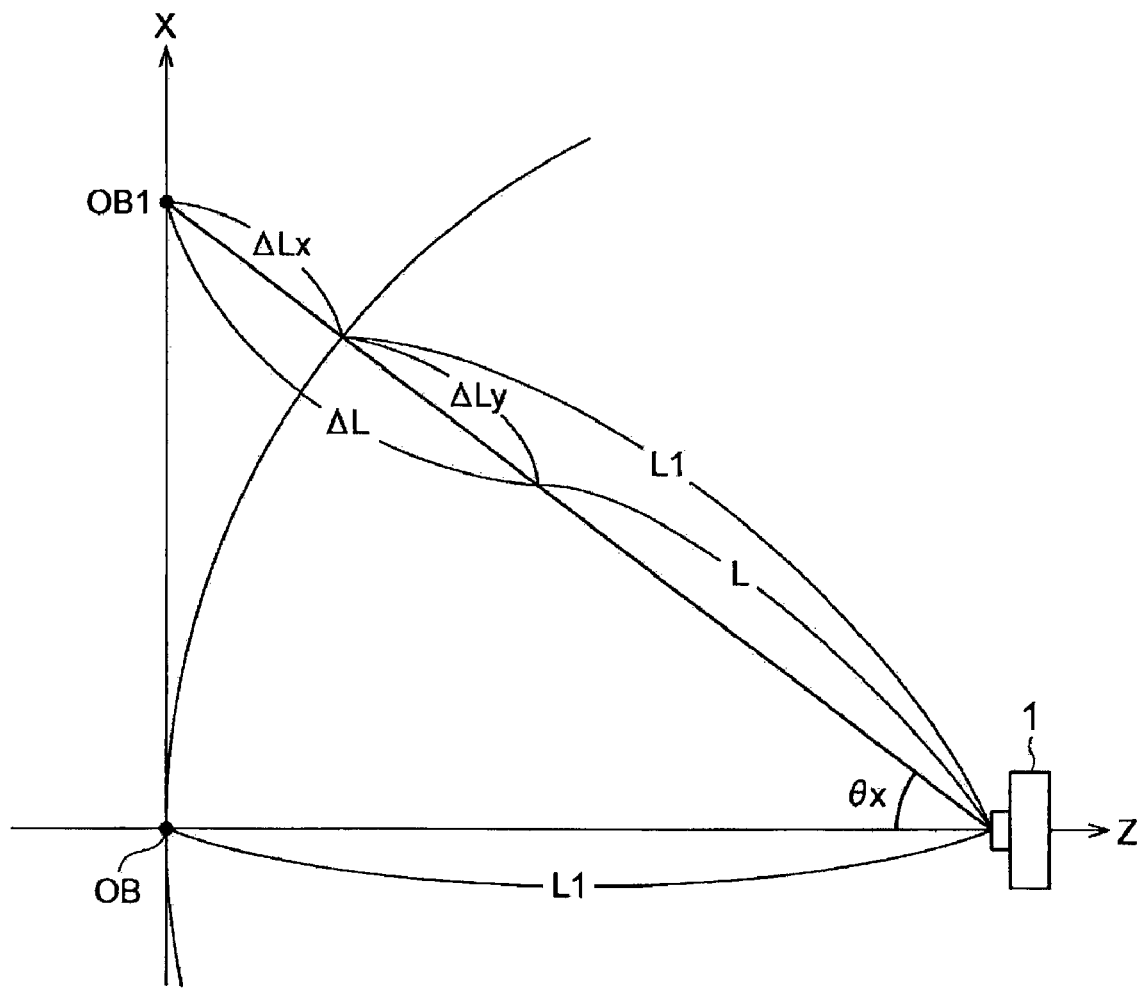
FIG. 10 is a diagram illustrating an autofocus correcting process in the X-axis direction.

FIG. 10 is a diagram illustrating the autofocus correcting process in the X-axis direction.

In the autofocus correcting process, the CPU 11 calculates an autofocus correction amount ΔL on the basis of the camera shake amount θx in the X-axis direction and the camera shake amount θy in the Y-axis direction.

More specifically, as shown in FIG. 9, first an autofocus correction amount ΔLy in the Y-axis direction is calculated on the basis of the camera shake amount θy in the Y-axis direction by the following Expression:

$\Delta Ly = (L/\cos \theta y) - L$.

As a result, a distance L1 to a virtual subject OB1 obtained by correcting only the camera shake amount in the Y-axis direction is obtained as follows:

$L1 = L + \Delta Ly$.

Then, as shown in FIG. 10, the CPU 11 calculates an autofocus correction amount ΔLx in the X-axis direction on the basis of the camera shake amount θx in the X-axis direction and the distance L1 to the virtual subject OB1 by the following Expression:

$\Delta Lx = (L1/\cos \theta x) - L1$.

Then, the CPU 11 calculates the autofocus correction amount ΔL on the basis of the above-mentioned results as follows:

$\Delta L = \Delta Lx + \Delta Ly$.

Then, the CPU 11 controls the camera control circuit 21 to perform the autofocus correcting process on the basis of the autofocus correction amount ΔL, and performs an image capturing process using the position deviating from the focal position obtained in step S42 by the autofocus correction amount ΔL as a new focal position (step S51).

Subsequently, the CPU 11 fixes the lens to the new focal position in an autofocus lock state by the autofocus correcting process in step S50 and controls the image capturing camera 22 to capture an image. Then, the CPU 11 performs an image data acquiring process of temporarily storing obtained image data in the RAM 23 for an image capturing unit and storing the image data in the removable medium 50 under the control of the control unit 10. Then, the CPU 11 displays the captured image on the display panel 24 while storing the image data in the removable medium 50.

When it is determined in step S47 that the average value X of the amounts of movement is equal to or larger than the AF correction shake amount R1, that is, $X \geq R1$, the CPU 11 determines whether the average value X of the amounts of movement is smaller than an AF reset shake amount R2 (>R1>Q>P), that is, X<R2, so as to determine whether the autofocus control should be performed again (step S48).

When it is determined in step S47 that the average value X of the amounts of movement is smaller than the AF reset shake amount R2, that is, X<R2, the CPU 11 performs the process of step S42 again.

When it is determined in step S47 that the average value X of the amounts of movement is equal to or larger than the AF reset shake amount R2, that is, $X \geq R2$, the CPU 11 determines that it is difficult to capture an image using the auto shutter function and turns off the auto shutter function to end the process (step S49).

As described above, according to the third embodiment, it is possible to determine whether image capturing conditions, such as autofocus (autofocus position), exposure, and camera shake, are satisfied during actual image capturing, and it is possible to automatically press the shutter on the basis of the determination. In addition, when the auto shutter function is used, it is possible to automatically correct camera shake after autofocus, and thus to obtain a clear image without blur.

In the above-described embodiments, the contrast detecting method is used to detect a focal position, but the invention is not limited thereto. For example, various methods may be used to detect an autofocus position. That is, the following methods may be used to detect an autofocus position: an active detecting method of radiating infrared rays or supersonic waves onto an object (subject) and measuring the distance to the object on the basis of the time required for the infrared rays or supersonic waves reflected from the object to return or the radiation angle; and a passive detecting method such as a method of detecting a phase difference.

In the above-described embodiments, it is premised that the gyro sensors, which are movement sensors, are always driven, but the invention is not limited thereto. For example, whether the composition of a picture is determined during photographing may be determined on the basis of the correlation between a plurality of frames. In this case, when the composition of a picture is determined, power may be supplied to the gyro sensors, which are movement sensors, or an operational frequency may increase. This structure makes it possible to reduce the power consumption of an image capturing apparatus.

In the above-described embodiments, the image capturing apparatus is always operated in an auto shutter mode, but the invention is not limited thereto. For example, when the composition of a picture is determined during photographing by the above-mentioned method, the image capturing apparatus may turn to the auto shutter mode.

The structures according to the first and second embodiments can accurately check the time when the camera shake correcting mechanism is operated and the time when power is actually supplied to the camera shake correcting mechanism, thereby reduce the power consumption of the digital still camera. However, the third embodiment can reduce the power consumption of an image capturing apparatus without checking the times.

More specifically, the following aspects can be considered.

According to a first aspect, an image capturing apparatus includes: a shake amount detecting unit that detects a shake amount; an image capturing condition determining unit that determines whether predetermined image capturing conditions including the shake amount are satisfied; an auto shutter operating unit that performs an image capturing process in an auto shutter mode for automatically pressing a shutter when the image capturing conditions are satisfied; and an auto shutter mode releasing unit that releases the auto shutter mode when the image capturing conditions are not satisfied in the auto shutter mode.

In this case, according to a second aspect, in the image capturing apparatus according to the first aspect, the correction control unit determines whether the shake amount is larger than a predetermined data reacquisition shake amount. When the shake amount is larger than the predetermined data reacquisition shake amount, the correction control unit controls the shake amount detecting unit to reacquire the shake amount.

According to a third aspect, the image capturing apparatus according to the first aspect further includes: an autofocus mechanism that automatically brings a subject into focus to move a lens to a focal position; and an autofocus correcting unit that, before the image capturing process is performed in the auto shutter mode, corrects the focal position on the basis of the shake amount in the optical axis direction of the lens and moves the lens to the correction focal position.

According to a forth aspect, the image capturing apparatus according to the third aspect further includes an autofocus reset control unit that determines whether the shake amount is larger than a predetermined autofocus reset shake amount, and controls the autofocus mechanism to move the lens to a new focal position when the shake amount is larger than the predetermined autofocus reset shake amount.

According to a fifth aspect, in the image capturing apparatus according to any one of the first to fourth aspects, the shake amount detecting unit includes gyro sensors, and detects the shake amount on the basis of angular velocity detection signals output from the gyro sensors.

According to a sixth aspect, there is provided a method of controlling an image capturing apparatus including a shake correcting mechanism that performs a shake correcting process on a captured image on the basis of a shake amount. The method includes: detecting the shake amount; determining whether predetermined image capturing conditions including the shake amount are satisfied; performing an image capturing process in an auto shutter mode for automatically pressing a shutter when the image capturing conditions are satisfied; and releasing the auto shutter mode when the image capturing conditions are not satisfied in the auto shutter mode.

According to a seventh aspect, there is provided a computer readable storage medium having a control program for allowing a computer to control an image capturing apparatus that includes a shake amount detecting unit for detecting a shake amount and a shake correcting mechanism for performing a shake correcting process on a captured image on the basis of the detected shake amount. In the storage medium, the recorded control program allows the computer to execute: detecting the shake amount; determining whether predetermined image capturing conditions including the shake amount are satisfied; performing an image capturing process in an auto shutter mode for automatically pressing a shutter when the image capturing conditions are satisfied; and releasing the auto shutter mode when the image capturing conditions are not satisfied in the auto shutter mode.

Modifications

In the above-mentioned embodiments, a camera shake correcting process is performed on only the camera shake in the X-axis and Y-axis direction, but the invention is not limited thereto. For example, a Z-axis gyro sensor may be further provided in the camera shake amount detecting unit 30, and the camera shake correcting process (autofocus correction) may be performed on the camera shake in the Z-axis direction (in the optical axis direction of the lens).

In the above-mentioned embodiments, the digital still camera is used as an image capturing apparatus, but the invention is not limited thereto. For example, the invention may be applied to electro-optical apparatuses capable of capturing still images, such as a camera provided in a cellular phone, a camera integrated with a PDA, and a single lens camera.

In the above-mentioned embodiments, the amount of camera shake is detected on the basis of an angular velocity, but the invention is limited thereto. For example, an acceleration sensor may be used to detect the amount of camera shake (the amount of movement).

What is claimed is:

1. An image capturing apparatus comprising:
a shake amount detecting unit that detects a shake amount including an x-axis shake amount ($\theta x$) in the x-axis direction and a y-axis shake amount ($\theta y$) in the y-axis direction;
a composition determining unit that determines whether a composition of a picture is determined during image capturing on the basis of a correlation among a plurality of frames by comparing a current frame with a previous frame and determining that the composition of the picture is determined when the correlation between the current frame and the previous frame is greater than a predetermined reference correlation value;
a shake correcting unit that performs a shake correcting process on a captured image on the basis of the detected shake amount, the shake correcting unit starting the shake correcting process by supplying power to a camera shake correcting mechanism for driving a lens of the image capturing apparatus;
a correction control unit that controls the shake correcting unit to start the shake correcting process when the shake amount is smaller than a predetermined reference shake amount and when the composition of the picture has been determined by the composition determining unit a predetermined reference number of times within a predetermined period of time;

an autofocus correcting unit that determines an autofocus correction amount ($\Delta L$) on the basis of the x-axis shake amount ($\theta x$) and the y-axis shake amount ($\theta y$) according to the following equations:

$$\Delta L = \Delta Lx + \Delta Ly,$$

$$\Delta Ly = (L/\cos\theta y) - L,$$

$$\Delta Lx = (L1/\cos\theta x) - L1, \text{ and}$$

$$L1 = L + \Delta Ly,$$

wherein L is a distance to a virtual subject obtained by correcting only the x-axis shake amount ($\theta x$), L1 is a distance to a virtual subject obtained by correcting only the y-axis shake amount ($\theta y$), and wherein the autofocus correcting unit determines a corrected focal position based on the autofocus correction amount ($\Delta L$); and an autofocus mechanism that automatically brings a subject into focus by moving a lens of the image capturing apparatus based on the corrected focal position.

2. The image capturing apparatus according to claim 1, wherein the composition determining unit determines that the composition of a picture is determined during image capturing when a value indicating the correlation among the plurality of frames including the current frame is larger than the predetermined reference correlation value.

3. The image capturing apparatus according to claim 1, wherein the shake correcting unit performs the shake correcting process on the basis of at least one of a lens shift process, a CCD shift process, or image processing.

4. The image capturing apparatus according to claim 1, wherein the shake detecting unit includes gyro sensors, and detects the shake amount on the basis of angular velocity detection signals output from the gyro sensors.

5. The image capturing apparatus according to claim 1, further comprising:

an image capturing condition determining unit that determines whether predetermined image capturing conditions including the shake amount are satisfied;

an auto shutter operating unit that performs an image capturing process in an auto shutter mode for automatically pressing a shutter when the image capturing conditions are satisfied; and an auto shutter mode releasing unit that releases the auto shutter mode when the image capturing conditions are not satisfied in the auto shutter mode.

6. The image capturing apparatus according to claim 5, wherein the correction control unit determines whether the shake amount is larger than a predetermined data reacquisition shake amount, and when the shake amount is larger than the predetermined data reacquisition shake amount, the correction control unit controls the shake amount detecting unit to reacquire the shake amount.

7. The image capturing apparatus according to claim 1, further comprising:

an autofocus reset control unit that determines whether the shake amount is larger than a predetermined autofocus reset shake amount, and controls the autofocus mechanism to move the lens to a new focal position when the shake amount is larger than the predetermined autofocus reset shake amount.

8. The image capturing apparatus according to claim 5, wherein the shake amount detecting unit includes gyro sensors, and detects the shake amount on the basis of angular velocity detection signals output from the gyro sensors.

9. A method of controlling an image capturing apparatus including a shake correcting mechanism that performs a shake correcting process on a captured image on the basis of a shake amount, comprising:

detecting the shake amount including an x-axis shake amount ($\theta x$) in the x-axis direction and a y-axis shake amount ($\theta y$) in the y-axis direction;

determining whether a composition of a picture is determined during image capturing on the basis of a correlation among a plurality of frames by comparing a current frame with a previous frame and determining that the composition of the picture is determined when the correlation between the current frame and the previous frame is greater than a predetermined reference correlation value;

controlling the shake correcting mechanism to start the shake correcting process by supplying power to the shake correcting mechanism when the shake amount is smaller than a predetermined reference shake amount and the when composition of the picture has been determined a predetermined reference number of times within a predetermined period of time;

determining an autofocus correction amount ($\Delta L$) on the basis of the x-axis shake amount ($\theta x$) and the y-axis shake amount ($\theta y$) according to the following equations:

$$\Delta L = \Delta Lx + \Delta Ly,$$

$$\Delta Ly = (L/\cos\theta y) - L,$$

$$\Delta Lx = (L1/\cos\theta x) - L1, \text{ and}$$

$$L1 = L + \Delta Ly,$$

wherein L is a distance to a virtual subject obtained by correcting only the x-axis shake amount ($\theta x$), L1 is a distance to a virtual subject obtained by correcting only the y-axis shake amount ($\theta y$);

determining a corrected focal position based on the autofocus correction amount ($\Delta L$); and bringing a subject into focus by moving a lens of the image capturing apparatus based on the corrected focal position.

10. The method of controlling an image capturing apparatus according to claim 9, further comprising:

determining whether predetermined image capturing conditions including the shake amount are satisfied;

performing an image capturing process in an auto shutter mode for automatically pressing a shutter when the image capturing conditions are satisfied; and releasing the auto shutter mode when the image capturing conditions are not satisfied in the auto shutter mode.

11. A computer readable storage medium comprising a control program for allowing a computer to control an image capturing apparatus that includes a shake amount detecting unit for detecting a shake amount and a shake correcting mechanism for performing a shake correcting process on a captured image on the basis of the detected shake amount, wherein the control program allows the computer to execute:

detecting the shake amount including an x-axis shake amount (θx) in the x-axis direction and a y-axis shake amount (θy) in the y-axis direction;

determining whether a composition of a picture is determined during image capturing on the basis of a correlation among a plurality of frames by comparing a current frame with a previous frame and determining that the composition of the picture is determined when the correlation between the current frame and the previous frame is greater than a predetermined reference correlation value;

controlling the shake correcting mechanism to start the shake correcting process by supplying power to the shake correcting mechanism when the shake amount is smaller than a predetermined reference shake amount and determined that when the composition of the picture has been determined a predetermined reference number of times within a predetermined period of time;

determining an autofocus correction amount (ΔL) on the basis of the x-axis shake amount (θx) and the y-axis shake amount (θy) according to the following equations:

$$\Delta L = \Delta Lx + \Delta Ly,$$

$$\Delta Ly = (L/\cos \theta y) - L,$$

$$\Delta Lx = (L1/\cos \theta x) - L1, \text{ and}$$

$$L1 = L + \Delta Ly,$$

wherein L is a distance to a virtual subject obtained by correcting only the x-axis shake amount (θx), L1 is a distance to a virtual subject obtained by correcting only the y-axis shake amount (θy);

determining a corrected focal position based on the autofocus correction amount (ΔL); and bringing a subject into focus by moving a lens of the image capturing apparatus based on the corrected focal position.

12. The storage medium according to claim 11, further comprising a control program for allowing the computer to execute:

determining whether predetermined image capturing conditions including the shake amount are satisfied;

performing an image capturing process in an auto shutter mode for automatically pressing a shutter when the image capturing conditions are satisfied; and releasing the auto shutter mode when the image capturing conditions are not satisfied in the auto shutter mode.

* * * * *